United States Patent
Archer et al.

(10) Patent No.: US 8,495,411 B2
(45) Date of Patent: Jul. 23, 2013

(54) ALL ROW, PLANAR FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2194 days.

(21) Appl. No.: 11/052,662

(22) Filed: Feb. 7, 2005

(65) Prior Publication Data

US 2006/0179270 A1 Aug. 10, 2006

(51) Int. Cl.
*G06F 11/00* (2006.01)

(52) U.S. Cl.
USPC .................... 714/4.1; 709/223; 709/224

(58) Field of Classification Search
USPC ........................................................... 714/4
See application file for complete search history.

(56) References Cited

U.S. PATENT DOCUMENTS

| | | | |
|---|---|---|---|
| 4,320,508 A | 3/1982 | Takezoe | |
| 4,376,973 A | 3/1983 | Chivers | |
| 5,230,047 A * | 7/1993 | Frey et al. | 714/4 |
| 5,325,518 A * | 6/1994 | Bianchini, Jr. | 714/31 |
| 5,537,653 A | 7/1996 | Bianchini, Jr. | |
| 5,561,769 A | 10/1996 | Kumar et al. | |
| 5,590,284 A | 12/1996 | Crosetto | |
| 5,684,807 A * | 11/1997 | Bianchini et al. | 714/712 |
| 5,835,697 A | 11/1998 | Watabe et al. | |
| 5,920,267 A | 7/1999 | Tattersall et al. | |
| 6,073,249 A | 6/2000 | Watabe et al. | |
| 6,108,796 A | 8/2000 | Lasken | |
| 6,233,702 B1 | 5/2001 | Horst et al. | |
| 6,714,552 B1 | 3/2004 | Cotter | |
| 6,880,100 B2 | 4/2005 | Mora et al. | |
| 7,046,621 B2 | 5/2006 | Wang et al. | |
| 7,058,008 B1 | 6/2006 | Wilson et al. | |
| 7,058,848 B2 | 6/2006 | Sicola et al. | |
| 7,085,959 B2 | 8/2006 | Safford | |
| 7,139,925 B2 | 11/2006 | Dinker et al. | |
| 7,149,920 B2 | 12/2006 | Blumrich et al. | |
| 2001/0052084 A1 | 12/2001 | Huang et al. | |
| 2002/0133756 A1 | 9/2002 | Jain | |
| 2002/0169861 A1 | 11/2002 | Chang et al. | |
| 2002/0178306 A1 | 11/2002 | Shimizu | |
| 2003/0023893 A1* | 1/2003 | Lee et al. | 714/4 |
| 2003/0198251 A1 | 10/2003 | Black et al. | |
| 2004/0008719 A1 | 1/2004 | Ying | |
| 2005/0188283 A1 | 8/2005 | Pomaranski et al. | |
| 2005/0198097 A1 | 9/2005 | Kalnitsky | |

(Continued)

OTHER PUBLICATIONS

Park et al. 'Fault-Tolerant Broadcasting in Wormhole-Routed Torus Networks'. 2002. IEEE computer society.*

(Continued)

*Primary Examiner* — Yolanda L Wilson
(74) *Attorney, Agent, or Firm* — Wood, Herron & Evans LLP

(57) ABSTRACT

An apparatus, program product and method for detecting nodal faults may simultaneously cause designated nodes of a cell to communicate with all nodes adjacent to each of the designated nodes. Furthermore, all nodes along the axes of the designated nodes are made to communicate with their adjacent nodes, and the communications are analyzed to determine if a node or connection is faulty.

27 Claims, 3 Drawing Sheets

U.S. PATENT DOCUMENTS

2005/0246569 A1* 11/2005 Ballew et al. .................. 714/4
2006/0117208 A1   6/2006 Davidson
2006/0117212 A1   6/2006 Meyer et al.

OTHER PUBLICATIONS

Azeez et al. 'I/O Node Placement for Performance and Reliability in Torus Networks'.*
Almasi et al. 'Optimization of MPI Collective Communication on Bluegene/L Systems. Jun. 2005. ACM.*
Chiang et al. "Multi-Address Encoding for Multicast". http://citeseerx.ist.psu.edu/viewdoc/summary?doi=10.1.1.56.7891.*
Cunningham et al. "Fault-Tolerant Adaptive Routing for Two-Dimensional Meshes." IEEExplore.
U.S. Patent and Trademark Office, Office Action issued in related U.S. Appl. No. 11/052,658, dated Jan. 7, 2008.
U.S. Patent and Trademark Office, Final Office Action issued in related U.S. Appl. No. 11/052,658, dated Jul. 23, 2008.
U.S. Patent and Trademark Office, Office Action issued in related U.S. Appl. No. 11/052,658, dated Feb. 19, 2009.
U.S. Patent and Trademark Office, Office Action issued in related U.S. Appl. No. 11/052,658, dated Oct. 30, 2009.
U.S. Patent and Trademark Office, Notice of Allowance issued in related U.S. Appl. No. 11/052,658, dated Jun. 29, 2010.
U.S. Patent and Trademark Office, Office Action issued in related U.S. Appl. No. 11/052,659, dated Sep. 21, 2007.
U.S. Patent and Trademark Office, Office Action issued in related U.S. Appl. No. 11/052,659, dated Mar. 20, 2008.
U.S. Patent and Trademark Office, Notice of Allowance issued in related U.S. Appl. No. 11/052,659, dated Jul. 24, 2008.
U.S. Patent and Trademark Office, Office Action issued in related U.S. Appl. No. 12/248,175, dated Aug. 27, 2010.
U.S. Patent and Trademark Office, Notice of Allowance issued in related U.S. Appl. No. 12/248,175, dated Dec. 15, 2010.
U.S. Patent and Trademark Office, Office Action issued in related U.S. Appl. No. 11/052,660, dated Sep. 21, 2007.
U.S. Patent and Trademark Office, Office Action issued in related U.S. Appl. No. 11/052,660, dated Feb. 7, 2008.
U.S. Patent and Trademark Office, Final Office Action issued in related U.S. Appl. No. 11/052,660, dated May 1, 2008.
U.S. Patent and Trademark Office, Notice of Allowance issued in related U.S. Appl. No. 11/052,660, dated Jun. 4, 2008.
U.S. Patent and Trademark Office, Office Action issued in related U.S. Appl. No. 12/197,556, dated Mar. 25, 2009.
U.S. Patent and Trademark Office, Notice of Allowance issued in related U.S. Appl. No. 12/197,556, dated Sep. 23, 2009.
U.S. Patent and Trademark Office, Office Action issued in related U.S. Appl. No. 12/197,563, dated Aug. 24, 2010.
U.S. Patent and Trademark Office, Final Office Action issued in related U.S. Appl. No. 12/197,563, dated Feb. 16, 2011.
U.S. Patent and Trademark Office, Office Action issued in related U.S. Appl. No. 12/197,563, dated May 12, 2011.
U.S. Patent and Trademark Office, Notice of Allowance issued in related U.S. Appl. No. 12/197,563, dated Oct. 4, 2011.
U.S. Patent and Trademark Office, Office Action issued in related U.S. Appl. No. 11/052,661, dated Sep. 21, 2007.
U.S. Patent and Trademark Office, Final Office Action issued in related U.S. Appl. No. 11/052,661, dated Mar. 19, 2008.
U.S. Patent and Trademark Office, Notice of Allowance issued in related U.S. Appl. No. 11/052,661, dated May 21, 2008.
U.S. Patent and Trademark Office, Office Action issued in related U.S. Appl. No. 12/165,732, dated Sep. 4, 2009.
U.S. Patent and Trademark Office, Notice of Allowance issued in related U.S. Appl. No. 12/165,732, dated Feb. 17, 2010.
U.S. Patent and Trademark Office, Office Action issued in related U.S. Appl. No. 12/165,784, dated Mar. 18, 2009.
U.S. Patent and Trademark Office, Final Office Action issued in related U.S. Appl. No. 12/165,784, dated Oct. 13, 2009.
U.S. Patent and Trademark Office, Notice of Allowance issued in related U.S. Appl. No. 12/165,784, dated Jun. 29, 2010.
U.S. Patent and Trademark Office, Office Action issued in related U.S. Appl. No. 11/052,663, dated Sep. 27, 2007.
U.S. Patent and Trademark Office, Final Office Action issued in related U.S. Appl. No. 11/052,663, dated May 2, 2008.
U.S. Patent and Trademark Office, Notice of Allowance issued in related U.S. Appl. No. 11/052,663, dated Jun. 18, 2008.
U.S. Patent and Trademark Office, Notice of Allowance issued in related U.S. Appl. No. 12/196,889, dated Mar. 23, 2009.
U.S. Patent and Trademark Office, Office Action issued in related U.S. Appl. No. 12/196,931, dated Oct. 20, 2010.
U.S. Patent and Trademark Office, Final Office Action issued in related U.S. Appl. No. 12/196,931, dated Feb. 22, 2011.
U.S. Patent and Trademark Office, Notice of Allowance issued in related U.S. Appl. No. 12/196,931, dated Jun. 16, 2011.
U.S. Patent and Trademark Office, Office Action issued in related U.S. Appl. No. 11/050,945, dated Oct. 3, 2007.
U.S. Patent and Trademark Office, Final Office Action issued in related U.S. Appl. No. 11/050,945, dated Mar. 31, 2008.
U.S. Patent and Trademark Office, Notice of Allowance issued in related U.S. Appl. No. 11/050,945, dated Jul. 23, 2008.
U.S. Patent and Trademark Office, Office Action issued in related U.S. Appl. No. 12/256,355, dated Mar. 5, 2010.
U.S. Patent and Trademark Office, Notice of Allowance issued in related U.S. Appl. No. 12/256,355, dated Jul. 30, 2010.

* cited by examiner

ALL ROW, PLANAR FAULT DETECTION SYSTEM

This invention was made with Government support under Contract No. B519700 awarded by the Department of Energy. The Government has certain rights in this invention.

CROSS-REFERENCE TO RELATED APPLICATIONS

This application is related to the following U.S. patent applications all filed on even date herewith by Charles Jens Archer et al.: Ser. No. 11/052,658, entitled "ALL-TO-ALL SEQUENCED FAULT DETECTION SYSTEM," Ser. No. 11/052,659, entitled "CELL BOUNDARY FAULT DETECTION SYSTEM," Ser. No. 11/052,660, entitled "ROW FAULT DETECTION SYSTEM," Ser. No. 11/052,661, entitled "MULTI-DIRECTIONAL FAULT DETECTION SYSTEM," and Ser. No. 11/052,663, entitled "BISECTIONAL FAULT DETECTION SYSTEM,". The present application is also related to U.S. patent application filed on even date herewith by John A. Gunnels et al., Ser. No. 11/050,945, entitled "SYSTEM AND METHOD FOR DETECTING A FAULTY OBJECT IN A SYSTEM,". Each of these applications is incorporated by reference herein.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system.

The relatively large number of nodes used in some such systems, however, can complicate node maintenance. Ironically, the very redundancy that enables fault tolerance can sometimes challenge processes used to find faulty nodes. With so many nodes and alternative data paths, it may be difficult to pinpoint the address, or even the general region of a node, or nodal connection requiring service.

As such, a significant need exists for a more effective way of determining and locating faulty nodes in a parallel processing environment.

SUMMARY OF THE INVENTION

The invention addresses these and other problems associated with the prior art by providing an apparatus, program product, and method for determining a nodal fault within a parallel processing computer system. To this end, aspects of the invention may concurrently cause designated nodes of a cell to communicate with all nodes adjacent to each of the designated nodes. Furthermore, all nodes along the axes of the designated nodes may be made to communicate with their adjacent nodes. The communications may be analyzed to determine if a node or connection is faulty.

Aspects of the present invention may designate one or nodes in the cell in such a manner as contention for links during a given time step is minimized. During a subsequent time step, new nodes may designated and coordinated such that competition for common links remains minimal or non existent. Such features, which may also include rotating the dimensions of planes used to evaluate nodes, may relatively quickly evaluate all nodes and links without undesirably burdening system processors or memory.

The information pertaining to a located nodal fault may be logged and/or used to initiate servicing of the fault. The communications may further be evaluated in terms of latency and bandwidth conformance. Aspects of the invention may further allow multiple node pairs comprising a node from each section to communicate concurrently for efficiency considerations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
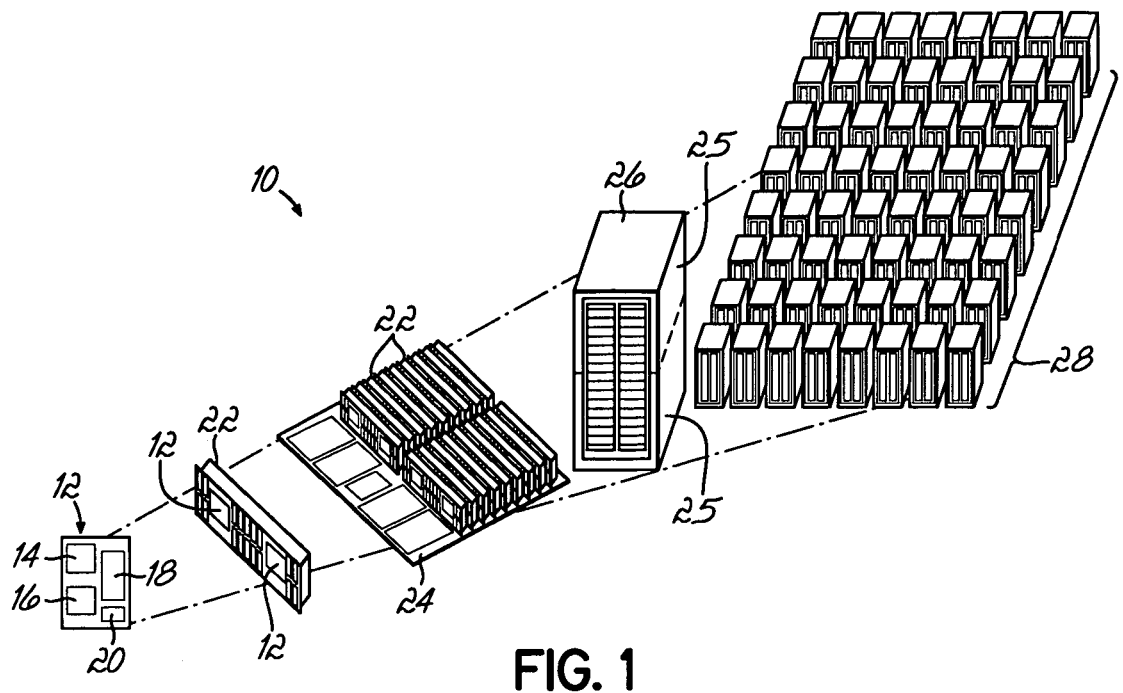
FIG. 1 is a block diagram that includes components of a parallel processing system configured to detect nodal faults using a scalable algorithm that sequentially sends packets from all nodes to all other nodes.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the present invention provide a system for detecting nodal faults. In one respect, the system may simultaneously cause designated nodes of a cell to communicate with all nodes adjacent to each of the designated nodes. Furthermore, all nodes along the axes of the designated nodes are made to communicate with their adjacent nodes.

Features of the invention further provide a generalized all-rows test that can test all links in a system in $3*n$ time steps, rather than the more conventional $3*n^2$ time steps. While adaptable to other environments, aspects of the invention may work most seamlessly on machines with nearly cubic configurations, e.g., midplanes.

A designated node executes all 3 rows message passing. More specifically, a designated node may do a three-row-test and pass messages down all 3 "rows"—the x dimension rows, the y dimension rows (columns) and the z dimension rows in both directions. Put another way, bidirectional communication occurs along three perpendicular, un-terminated lines that are parallel to each axis that intersects at the center node.

A nodal detection process may take at least three "rounds." Each round may correspond to one dimension (x, y, or z). Each round may have a number of time steps equal to the dimension of the largest cube that can be embedded in the machine configuration. For example, a 4×4×4 torus may have 4 time steps for each round. An 8×8×8 midplane may have 8 time steps for each round. An 8×8×16 rack may have 8 time steps in each round, but may take more rounds as the system divides up into logical cubes the irregularly shaped rack.

For each time step, four unique nodes form the center of four independent "3 rows" tests. Each unique node may be in a unique plane. During the first round, for example, the planes may be x=0, x=1, x=2, and x=3. For a given time step, lines originating from the designated nodes may extend in all three directions (x, y and z), and none will intersect (except at the designated nodes). That is, only the designated nodes pass messages in more than one direction at a time. All links between the planes are tested at least once by the time the round is done.

The system will test each "row" originating from a designated node. Since the system is rotated three times, each dimension forms a perpendicular axis at one point. Therefore, every link is tested at least once.

As stated previously, the aspects of the system can be generalized to any system shape. Each axis is tested (a total of three), and is named accordingly (either x, y, or z). Each starts with the designated nodes as the ones along a diagonal through the system, e.g., (0,0,0), (1,1,1), (2,2,2).

During each time step, one of the coordinates of the designated nodes may increase by one (and wraps around). In round 0, the z coordinate of each designated node increases by one in each time step. In round 1, the x coordinate increases by one in each time step. And, in round 2, the y coordinate increases for each time step.

If the system is not cubic, the system may be broken down into the largest possible composite cubes, and each cube may be tested consecutively. For each axis, a 3-row test may be run as many times as there are side nodes in that dimension. Each time, the coordinate of the center nodes corresponding to the dimension in question may be incremented, and the system may run the 3-row test with the new designated nodes. For an 8×8×16 rack, for example, rounds 0, 1, and 2 may include the midplane with z coordinates 0 through 7 and may proceed as normal. Rounds 3, 4, and 5 may be just like rounds 0, 1, and 2, but may be using the midplane with z coordinates 8 through 15.

The normal all rows test takes time $O(n^2)$ time to run (where n is the size of the largest dimension). Because nodal fault detection processes consistent with the invention run multiple row-triplets simultaneously, the system may run in $O(n)$ time. In a large system, this feature may translate into significant time savings.

Turning to the Drawings, wherein like numbers may denote like parts throughout several views, FIG. 1 shows components 12, 22, 24, 26 of a parallel processing system 28 configured to detect nodal faults using a scalable algorithm. FIG. 1 more particularly shows a parallel computing system 28, or apparatus, such as the BlueGene/L system created by International Business Machines. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two Application Specific Integrated Circuits (ASIC's) 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary highspeed and low latency networks. The networks typically include a three-dimensional torus network that wraps around the edges, and a combining tree network for fast global operations. The torus network includes point-to-point, serial links between routers embedded within the system ASIC's. As such, each ASIC has six nearest-neighbor connections, some of which may traverse relatively long cables.

Though not shown, the system 28 may include a front end, host computer used for compiling, diagnostics and/or analysis. An I/O node of the system 28 may handle communications between a compute node and other systems, including the host and file servers. The choice of host may depend on the class of applications, as well as their bandwidth and performance requirements.

Figure 2:
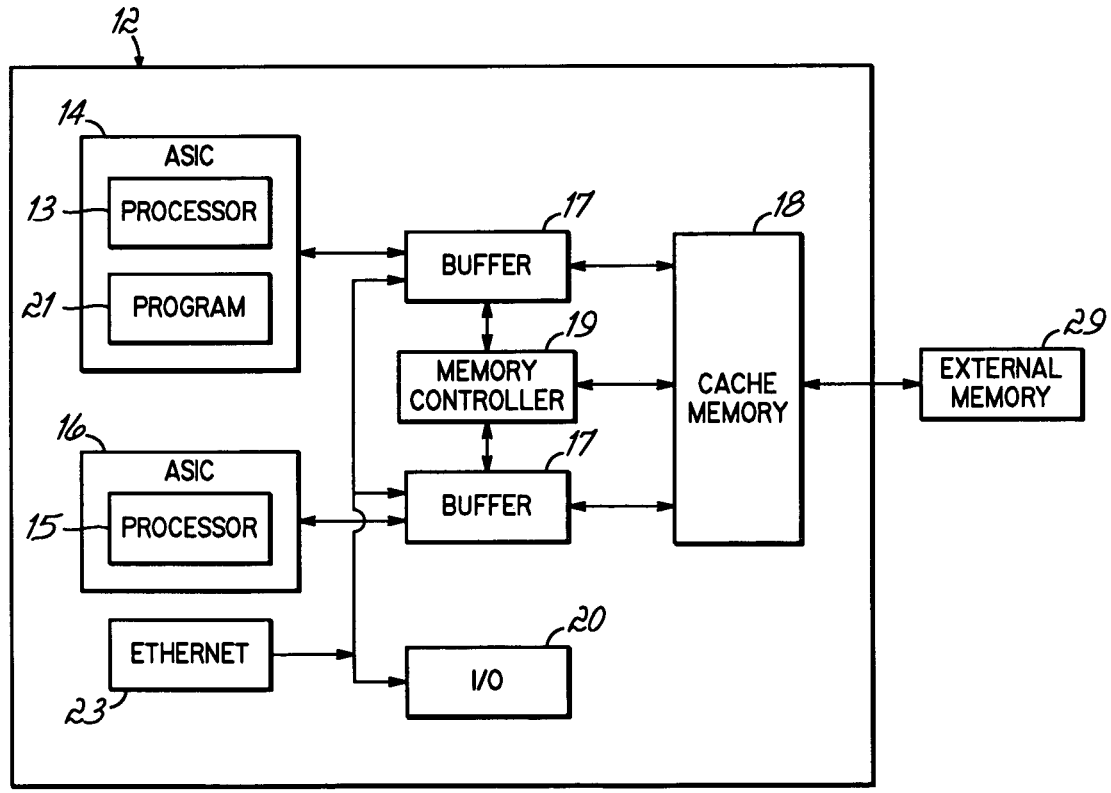
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on-chip memory. An on-chip memory controller 19 provides access to cache memory 18, such as Synchronous Dynamic Random Access Memory (SCRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the cache memory 18, memory controller 19 and associated buffers 17. Furthermore, one or more of the ASIC's 14, 16 may couple to a number of external devices, including an input/output interface 20, memory 29, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above-described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable checking for nodal faults. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
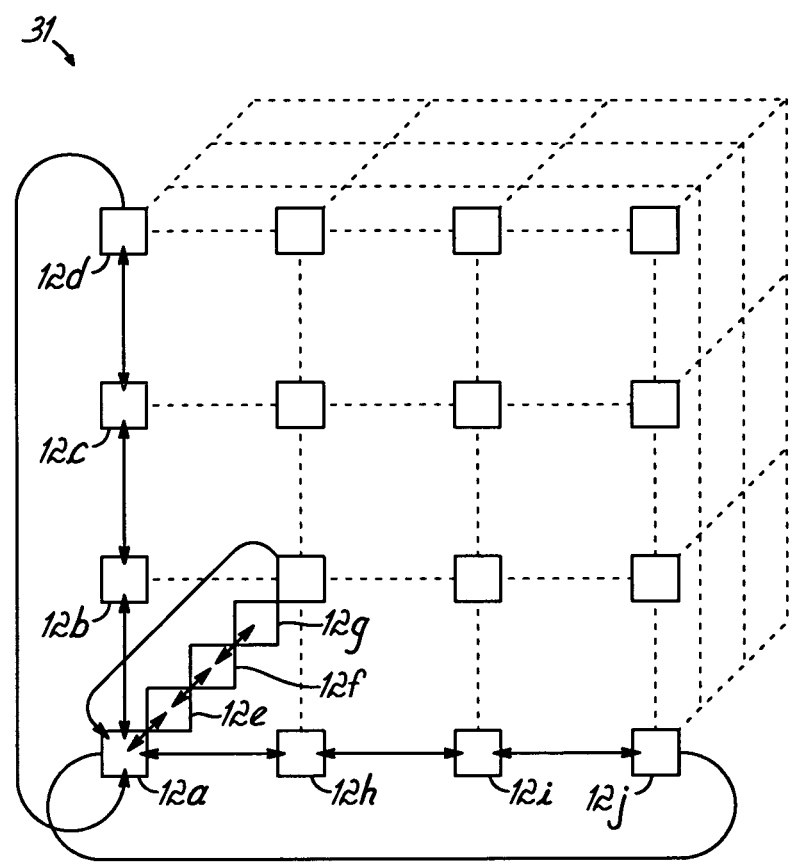
FIG. 3 is a block diagram of a cell of a parallel processing consistent with the invention.

FIG. 3 is a block diagram of a cell 31 of a parallel processing system consistent with the invention. The cell 31 includes a four-by-four-by-four structure of 64 interconnected computing nodes. In the context of the present invention, the cell 31 includes at least one designated node 12a. The designated node 12a has coordinates (0,0,0) and is configured to communicate with adjacent nodes 12b, 12d, 12e, 12g, 12h and 12j. As such, the term, "adjacent," for purposes of the specification includes logically and proximally neighboring nodes, i.e., sharing a direct connection. Additionally, nodes 12b-d, 12e-g, 12h-j located on the x, y and z axes of the designated node 12a may communicate with adjacent nodes in the same axis. For instance, node 12a may communicate with node 12e; node 12e may communicate with node 12f, which may also communicate with node 12g. Node 12g may communicate with 12a. Similar such communications may be concurrently accomplished along each axis, i.e., the remaining x and y axes.

Typically, there may be designated nodes on every level of a cell, and the designated cells usually communicate concurrently. Moreover, these designated nodes may be assigned and sequenced such that there is no overlapping use of links during a given time increment. To this end, the designation of the designated nodes may be coordinated in time. For example, designated nodes during a first time step and along respective x planes may include the coordinate sets: (0,0,0), (1,1,1), (2,2,2) and (3,3,3). Such node designations may avoid contention for commonly needed links, i.e., all communications are accomplished during the first time step over different links.

During a second time step and still along respective x planes, designated node coordinate sets may include: (0,0,1), (1,1,2), (2,2,3) and (3,3,0). The exemplary designated node positions were determined by adding one to the z component of the previous set. As such, new links are tested, but there is still no contention for links. A third time step may include designated nodes having the following coordinate sets: (0,0,2), (1,1,3), (2,2,0) and (3,3,1), while a fourth time set may include sets: (0,0,3), (1,1,0), (2,2,1) and (3,3,2). Because there are only four level, or parallel x planes, in the cell 31, the nodal fault detection processes may shift, or rotate, to another dimension, e.g., y or z planes, in response to the time step equaling four. The above processes may then be accomplished for the cell 31 with respect to a new dimension, or series of y or z planes, or slices.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
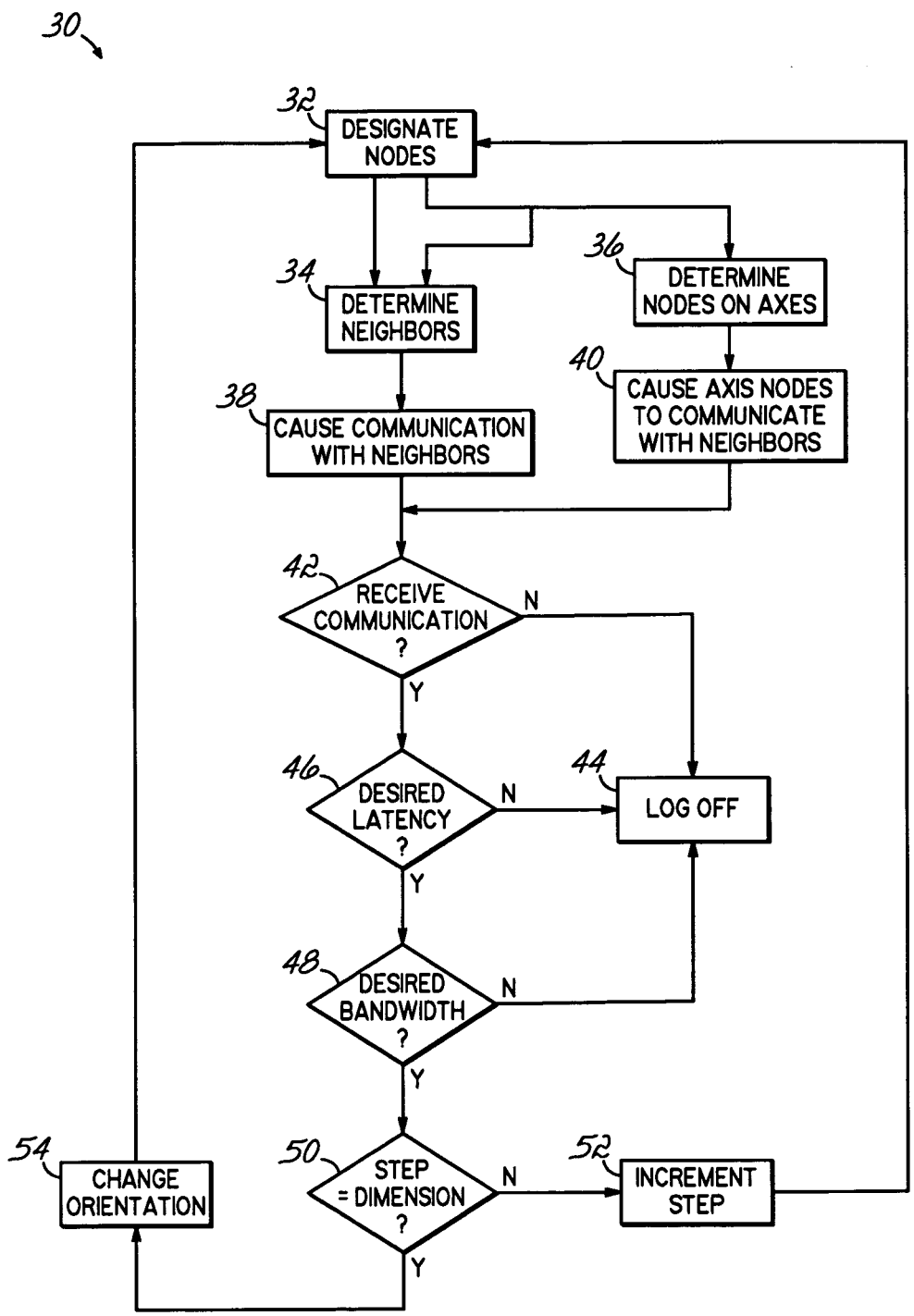
FIG. 4 is a flowchart having a set of exemplary steps executable by the system of FIG. 1 for conducting nodal fault detection processes consistent with the invention.

FIG. 4 is a flowchart 30 having a set of exemplary steps executable by the system 28 of FIG. 1 for conducting a nodal fault test. At block 32, the system 28 may determine or otherwise designate a node 12a. Each compute ASIC 14 of a node 12 may have the program 21 configured to execute the nodal fault test, and each node 12 may further receive a personality transmission communicating the node's coordinates and information about the number and position of other nodes in the cell 31.

Using this information, the designated node 12a may determine at block 34 those nodes 12b, 12d, 12e, 12g, 12h and 12j that are adjacent. The system 28 may concurrently at block 36 determine which nodes 12b-d, 12e-g, 12h-j are aligned along an axis of the designated node 12.

The system 28 may cause at block 38 the designated node 12a to communicate with its neighbors 12b, 12d, 12e, 12g, 12h and 12j. Such communications may include the sending and receipt of data packets between the designated node and each adjacent node 12b, 12d, 12e, 12g, 12h and 12j, i.e., paring nodes 12a and 12b, 12a and 12d, 12a and 12e, 12a and 12g, 12a and 12h, and 12a and 12j.

The system 28 may concurrently cause at block 40 those nodes 12b-d, 12e-g, 12h-j located along an axis of the designated node 12a to communicate, along with designated node 12a, all-in-a-row. For instance, node 12a may communicate with node 12e; node 12e may communicate with node 12f, which may also communicate with node 12g. Node 12g may communicate with 12a. Similar such communications may be concurrently accomplished along the remaining x and y axes.

Where a communication is unsuccessful at block 42, an error may be logged at block 44, and a user alerted. The absence of a return communication, for instance, may indicate a faulty connection between a paired nodes. An error may also be logged at block 44 if the performance of a communication between nodes fails to conform to a desired latency at block 46. Latency generally regards the time it takes the packet to arrive at its destination. Similarly, an error may be logged at block 44 if the performance of the communication fails to conform at block 48 with a desired bandwidth, or rate of data transmission.

If the time step does not equal the dimensions of the cell 31 at block 50, e.g., four time steps for a four-by-four-by-four cube, then the time step may be incremented at block 52. This action may coincide with the designation of new designated nodes within the same planar dimension, but with different coordinates, e.g., one coordinate position incremented in common direction orthogonal to the planar dimension. This feature may prevent competition for links during a given time step, maintaining desired performance.

Should system 28 alternatively determine that the time step at block 50 equals a dimension of the cell 31, then the system 28 at block 54 may change the orientation, or dimension of the nodal fault processes. For instance, instead of extending in the x plane, row and adjacent node tests based on newly designated nodes at block 30 may extend in the y or z direction. This feature ensure that all links (and nodes) are tested. This testing if furthermore accomplished in a manner that minimizes competition for links during a given time step.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. Furthermore, while cells discussed herein are described generally in the context of midplanes, one skilled in the art will appreciate that a midplane is just one type of cell in accordance with the principles of the present invention.

Moreover, while a cell comprises a grouping of nodes as discussed herein, a cell more particularly includes a grouping of nodes that communicates more quickly with each other than with other nodes. For instance, intra-cell communications generally require less cabling and associated routing processes. Furthermore, while the midplane cell of FIG. 3 shows a cubical structure, one skilled in the art will appreciate that cells may take on additional symmetric and asymmetric shapes, including those having more or less than six faces. Relatedly, while the torus network is a three dimensional network, networks and associated hardware/software may implicate fewer or more dimensions. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for determining a nodal fault within a parallel processing system having a plurality of nodes, the method comprising:
    designating a first node;
    causing the first designated node to communicate with all nodes adjacent to the first designated node;
    causing all nodes located along an axis of the first designated node to communicate with their respective adjacent nodes; and
    determining from the communications the nodal fault relating to the plurality of nodes.

2. The method of claim 1, wherein causing the first designated node to communicate with all nodes adjacent to the first designated node further includes determining the nodes adjacent to the first designated node.

3. The method of claim 1, wherein causing all nodes located along an axis of the first designated node to communicate with their respective adjacent nodes further includes determining the nodes located along an axis of the first designated node.

4. The method of claim 1, further comprising designating a second node and causing the second designated node to communicate concurrently with a node adjacent to the second designated node.

5. The method of claim 4, further comprising causing all nodes located along an axis of the second designated node to concurrently communicate with their respective adjacent nodes.

6. The method of claim 1, further comprising causing multiple designated nodes to concurrently communicate.

7. The method of claim 6, wherein causing the multiple designated nodes to concurrently communicate does not prompt communications concurrently over a common link.

8. The method of claim 1, wherein causing all nodes located along the axis of the first designated node to communicate further includes causing all nodes along all axes of the first designated node to communicate concurrently.

9. The method of claim 1, further comprising servicing the nodal fault.

10. The method of claim 1, wherein determining the nodal fault includes determining a fault associated with at least one of software, a connection, and another hardware component.

11. The method of claim 1, wherein determining the nodal fault includes determining a latency associated with a nodal communication.

12. The method of claim 1, wherein determining the nodal fault includes determining a bandwidth associated with a nodal communication.

13. The method of claim 1, further comprising storing an indication of the nodal fault.

14. The method of claim 1, further comprising generating a status signal indicative of a nodal communication.

15. An apparatus, comprising:
    a plurality of nodes;
    a network connecting the plurality of nodes; and
    program code executed by at least one of the plurality of nodes, the program code configured to designate a first node and to cause the first designated node to communicate with all nodes adjacent to the first designated node, the program code being further configured to cause all nodes located along an axis of the first designated node to communicate with their respective adjacent nodes, and to determine from the communications a nodal fault relating to the plurality of nodes.

16. The apparatus of claim 15, wherein the program code initiates determining the nodes adjacent to the first designated node.

17. The apparatus of claim 15, wherein the program code initiates determining the nodes located along an axis of the first designated node.

18. The apparatus of claim 15, wherein the program code initiates designating a second node and causing the second designated node to communicate concurrently with a node adjacent to the second designated node.

19. The apparatus of claim 18, wherein the program code initiates causing all nodes located along an axis of the second designated node to concurrently communicate with their respective adjacent nodes.

20. The apparatus of claim 15, wherein multiple designated nodes concurrently communicate.

21. The apparatus of claim 20, wherein the communications do not travel over a common link during a given time step.

22. The apparatus of claim 15, wherein the program code initiates causing all nodes along all axes of the first designated node to communicate concurrently.

23. The apparatus of claim 15, further comprising a memory for storing information pertaining to the nodal fault.

24. The apparatus of claim 15, wherein the program code initiates notifying a person to service the nodal fault.

25. The apparatus of claim 15, wherein the program code initiates determining a latency associated with a nodal communication.

26. The apparatus of claim 15, wherein the program code initiates determining a bandwidth associated with a nodal communication.

27. A computer readable storage medium comprising computer readable instructions stored thereon to be executed on a processor, the instructions comprising:
    program code for determining a nodal fault and configured to be executed by at least one of a plurality of nodes, wherein the program code is further configured to designate a first node and to cause the first designated node to communicate with all nodes adjacent to the first designated node, the program code being further configured to cause all nodes located along an axis of the first designated node to communicate with their respective adjacent nodes, and to determine from the communications the nodal fault relating to the plurality of nodes.

\* \* \* \* \*